United States Patent [19]
Blunt et al.

[11] Patent Number: 4,808,364
[45] Date of Patent: Feb. 28, 1989

[54] ROTATIONAL POLYMERIZATION MOLDING

[75] Inventors: Harry W. Blunt, Hockessin; Tuyen T. Nguyen, Newark, both of Del.

[73] Assignee: Hercules Incorporated, Wilmington, Del.

[21] Appl. No.: 811,189

[22] Filed: Dec. 20, 1985

Related U.S. Application Data

[63] Continuation of Ser. No. 593,007, Mar. 23, 1984, abandoned.

[51] Int. Cl.⁴ ............................................. B29C 41/04
[52] U.S. Cl. ...................................... 264/310; 264/311
[58] Field of Search ................................ 264/311, 310

[56] References Cited

U.S. PATENT DOCUMENTS

| | | | |
|---|---|---|---|
| 3,228,759 | 1/1966 | Small et al. | 264/311 |
| 3,997,645 | 12/1976 | Dempster | 264/311 |
| 4,400,340 | 8/1983 | Klosiewicz | 264/328.6 |

FOREIGN PATENT DOCUMENTS

| | | | |
|---|---|---|---|
| 42-13027 | 7/1967 | Japan | 264/311 |
| 4008710 | 2/1974 | Japan | 264/311 |
| 1380262 | 1/1975 | United Kingdom | 264/311 |

*Primary Examiner*—James Derrington
*Attorney, Agent, or Firm*—Dale R. Lovercheck

[57] ABSTRACT

A method of forming rotationally molded articles without providing significant heating, the method including: (a) providing a liquid monomer solution, and rotational molding means, the molding means having an inner chamber wall defining an inner chamber, the liquid monomer solution including catalyst and monomer; (b) conveying the liquid solution into the rotational molding means; (c) rotating the rotational molding means; (d) continuing the rotation while the solution polymerizes to form an article of polymer.

9 Claims, 1 Drawing Sheet

ROTATIONAL POLYMERIZATION MOLDING

This application is a continuation of application Ser. No. 593,007, filed Mar. 23, 1984 and now abandoned.

BACKGROUND OF THE INVENTION

Klosiewicz, U.S. Pat. No. 4,400,340, discloses a method of making a thermoset polydicyclopentadiene by first combining a plurality of reactant streams, one containing the activator of a metathesis-catalyst system, a second containing the catalyst of a metathesis-catalyst system and at least one containing dicyclopentadiene; then immediately injecting this combination into a mold where polymerization results in the formation of a tough, rigid thermoset polymer with high modulus and excellent impact strength.

Looman, et al., U.S. Pat. No. 3,887,728, discloses rotational molding to form molded articles using vinyl chloride-propylene copolymer. The heating and cooling times amount to 3–7 minutes each, depending on the heating and cooling system used, the wall thicknesses and the molded article and the actual mold and material of which it is made. Note column 3, lines 58–68 and column 5, lines 1 and 2. Powdered polymer is fed into the molds in the Looman, et al. process.

Takahashi, et al., U.S. Pat. No. 3,935,143 discloses feeding a mixture of polymers to a McNeil type rotating casting machine. Note column 4, lines 34–54.

Rees, U.S. Pat. No. 4,143,193, discloses a molded container made by providing a cross-linkable high density polyethylene powder in a mold which is attached to the arm of a McNeil-Akron Roto Cast rotational molding machine and transferring to an oven at 600° F. (315° C.), note column 4, Example 1, lines 41–46.

Looman, et al., U.S. Pat. No. 3,950,482, discloses a variation of Looman, et al., 3,887,728, as described above. Here again, a copolymer of vinyl chloride is fed to a rotational molding apparatus. In rotary molding machines, the powdered molding composition is matted upon contact with the heated mold surface. The mold can be heated by preheating circulated air, direct gas heating, low melting salt mixtures, and circulating heating bath fluids, liquids, column 4, lines 47 through 60.

Delacoste, U.S. Pat. No. 4,154,789, discloses a thermoplastic ball and method of manufacturing. In the Delacoste method, the thermoplastic is heated in a mold while imparting planetary motion to the mold.

Rotational molding is generally applicable to the molding of thermoplastic resins, and is applicable to plastic materials in the form of powder, grains or liquid. Commercial rotocasting devices are recommended by manufacturers as applicable to the molding of ABS resin as well as polyethylene, polyvinylchloride, polystyrene, nylon, cellulose butyrate, and cellulose acetate. Note Takahashi, et al., U.S. Pat. No. 3,935,143, column 1, lines 19 through 25.

SUMMARY OF THE INVENTION

A method of forming rotationally molded articles of rigid solid polymer without providing substantial heating or cooling from low viscosity liquid monomer, the method including:

(a) providing a liquid monomer solution, and rotational molding means, the molding means having an inner chamber wall defining an inner chamber, the liquid monomer solution including catalyst and monomer;

(b) conveying the liquid solution into the inner chamber of the rotational molding means;

(c) rotating the rotational molding means;

(d) continuing the rotation while the solution polymerizes to form an article of rigid solid polymer.

A method of forming rigid solid articles having a chamber therein from a liquid monomer solution including:

(a) providing a liquid monomer metathesis-catalysis solution, and rotational molding means, the molding means having an inner chamber wall defining an inner chamber said liquid monomer metathesis-catalysis solution comprising metathesis catalyst, norbornyl monomer, moderator and activator of a metathesis-catalyst system;

(b) conveying the liquid metathesis-catalysis solution into the rotational molding means, the amount of the solution within the molding means being insufficient to fill the inner chamber;

(c) rotating the rotational molding means, the rate of rotation being at least sufficient to substantially evenly distribute the liquid solution along the inner chamber wall;

(d) continuing the rotation while the solution polymerizes to form a rigid solid article having a cylindrical passage.

The process of the present invention provides for the formation of molded articles by rotating a metathesis-catalyst polymerization mixture of relatively short reaction time in a rotating mold while the mixture is being fed into the mold as well as during the brief hardening period. Polymerization takes place in the mold. This is in contrast to molding methods of the prior art where polymerization takes place prior to molding. The polymer is thermally melted to provide a liquid state for molding, and once molded, the polymer is allowed to reharden to retain its shape in the molded form. Thus, the process of the present invention provides a means for molding and simultaneous polymerization without the heat requirement of the prior art for melting polymer into a liquid state.

Beneficially, the process of the present invention provides an improved method of making molded articles. The benefits include the reduced equipment expenditure, reduced heating requirements and reduced production time.

Throughout this disclosure, $WCl_6$ catalyst is used to include $WCl_6$ and mixtures including $WCl_6$ and $WOCl_4$.

DETAILED DESCRIPTION OF THE INVENTION

Figure 1:
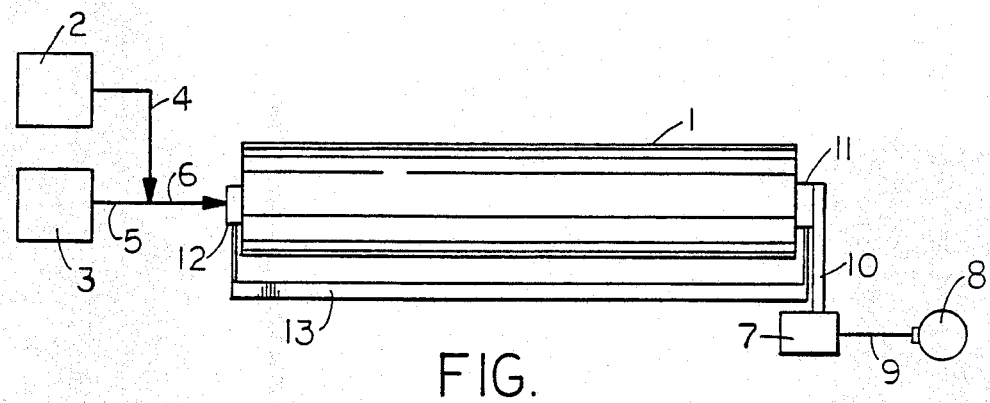
FIG. 1 is a schematic representation of a rotational molding system in accordance with the present invention.

With more particular reference to the Figures, the same number in the various Figures refers to the same item. Rotational mold body member 1 is supported by pivotal support members 11 and 12. Pivotal support members 11 and 12 are supported by support body member 13. The rotational mold, body member 1, is rotated on pivotal support members 11 and 12 by drive mechanism 10. Drive mechanism 10 may be a chain or belt, as is known in the art. The drive mechanism 10 is rotated by motor 7. Motor 7 is supplied with electricity through line 9 from power source 8.

Monomer catalyst solution container 2 provides monomer catalyst solution through line 4. The monomer activator solution container line 3 provides monomer activator solution to line 5. The monomer catalyst solution from line 4 mixes with the monomer activator solution from line 5 in line 6. The mixture of monomer catalyst solution and monomer activator solution is fed through line 6 through feed chip 19 into mold chamber 16. Feed channel wall 14 defines feed channel 19. Mold chamber wall 17 defines mold chamber 16.

Figure 4:
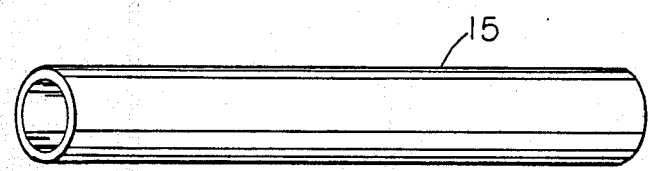
FIG. 4 is a perspective view of a pipe made in accordance with the present invention.

When the mixture of monomer catalyst and activator enters the mold chamber, it is a low viscosity liquid. The low viscosity liquid mixture may enter the chamber prior to rotation or during rotation. During rotation, the liquid is substantially evenly distributed along the mold chamber wall 17. Within a short period of time after mixing, the mixture monomer catalyst and activator polymerizes to form a rigid cross-linked polymer. FIG. 4 shows a rigid pipe or tube 15, which is formed in the mold chamber 16.

Figure 5:
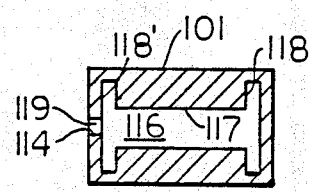
FIGS. 5 and 7 are cross-sectional views of alternative rotational mold members.
Figure 6:
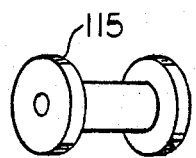
FIGS. 6 and 8 are respective views of the articles formed in the mold members of FIGS. 5 and 7 respectively.

FIG. 5 shows an alternative embodiment in which the mold chamber 116 is provided with elongated mold chamber walls 118 and 118'. The mold chamber 116 is defined by mold chamber wall 117. Monomer solution is fed into mold chamber 116 through the feed channel 119. Feed channel 119 is defined by feed channel wall 114. The FIG. 6 shows a thimble 115 formed in the mold chamber 101.

Figure 7:
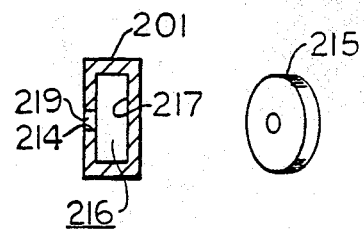

FIG. 7 shows an alternative embodiment for the mold chamber wherein the mold chamber 201 is of reduced length, as compared to its radius. This type of mold chamber is useful for making washers. The mold chamber 216 is defined by mold chamber wall 217. Monomer is fed through feed channel 219 into mold chamber 216. Feed channel 219 is defined by feed channel wall 214.

Figure 8:

FIG. 8 shows a washer 215 made in the mold chamber as shown in FIG. 7.

Figure 2:
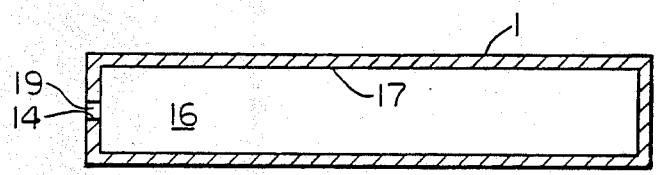
FIG. 2 is a longitudinal cross-sectional view of the rotational mold body member shown in FIG. 1.
Figure 3:
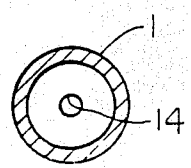
FIG. 3 is a cross-sectional end view of the rotational mold member shown in FIG. 1.

The FIGS. 2 and 3 show longitudinal and end views, respectively, of the mold chamber as shown in FIG. 1 in cross section.

By the method of the present invention, rotationally molded articles are formed without the need for providing substantial heat. In prior art methods, heating of polymer is required to bring the polymer to a fluid viscosity low enough to conform to the shape of the mold. By contrast, the low viscosity monomer fed to the mold by method of the present invention readily follows the shape of the mold. The monomer follows the shape of the mold in the method of the present invention without the need for heating bacause of its low viscosity. Thus in the process of the present invention, no heating is required. This is an improvement over known rotational molding processes where heating is required. For example, in Takahashi, et al., U.S. Pat. No. 3,935,143, column 4, lines 44 through 52, hot air is circulated in the mold for about twenty minutes at 350° C. The product is then cooled by spraying water on the external mold surface.

The subsequent cooling step required by the prior art is not necessary in the process of the present invention. The heat being removed by cooling in the prior art is also added in the prior art. Heat is not added in the process of the present invention, and it is not necessary that heat be removed.

In the process of the present invention, it is necessary that the material which will form the substance of the article being made by the rotational molding method of the present invention be distributed within the rotational mold prior to its acquiring a viscosity characteristic of a polymeric material. As discussed in greater detail below, a preferred embodiment of the method of the present invention uses a rate moderator to control the rate at which polymerization occurs within the rotational molding mold. The monomeric solution is rotated within the rotational molding mold and distributed therein while its viscosity is substantially characteristic of a monomeric material of low viscosity. After being distributed within the rotational mold to substantially the shape of the final product, the polymerization may take place raising the viscosity and ultimately forming a rigid article of polymer. Generally the distribution of monomer within the rotational molding device occurs rapidly, for example, from ten seconds to one minute. Because polymerization occurs rapidly following distribution, the entire molding process takes, for example, two minutes. This reduction in molding time as compared with the heating and cooling typical of the prior art, represents a significant reduction in production time. Note Takahashi, et al., U.S. Pat. No. 3,935,143, heats for about twenty minutes. This heating is followed by a cooling period.

METHATHESIS POLYMERIZATION FOR ROTATIONAL MOLDING

In the process of the prevent invention, a method is provided of forming rigid, solid articles of cross-linked polymer which are polymerized from a liquid fed into a rotational mold. The liquid fed into the rotational mold contains a norbornyl monomer. Additionally, the liquid feed contains a catalyst, an activator, and a moderator. Just prior to feeding the liquid into the mold, the catalyst and activator are mixed from two separate containers. The time period between mixing catalyst and activator is controlled by the moderator. Preferably, the time period from mixing to polymerization, which is controlled by the moderator, is less than or equal to five minutes. More preferably, this period is two minutes or less.

In a preferred embodiment of the invention, the rotational mold member is rotating while the mixture of monomer catalyst and activator is being fed into the rotational mold member. The polymerization reaction takes place as discussed in more detail below by metathesis-catalysis of a norbornyl monomer such as dicyclopentadiene. No heating or cooling is necessary for the polymerization. The rotation of the mold is continued during the polymerization until the polymer is sufficiently formed to maintain its shape. Because of the cross-linking which occurs during polymerization, the polymer is a thermoset, rigid material and forms solid articles having beneficial physical properties. The norbornyl monomers used to carry out the process of the present invention may be homopolymerized or copolymerized to form the rigid crosslinked polymers which form the improved materials, making the articles produced by the present invention. Exemplary of the polymers produced by the process of the present invention is dicyclopentadiene.

The norborene-type monomers that can be polymerized in accordance with the process described herein are characterized by the presence of the norbornene group, defined structurally by the following formula I:

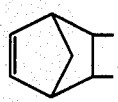

(I)

Pursuant to this definition, suitable norbornene-type monomers include substituted and unsubstituted norbornenes, dicyclopentadienes, dihydrodicyclopentadienes, trimers of cyclopentadiene, and tetracyclododecenes. Preferred monomers of the norbornene-type are those defined by the following formulas II and III:

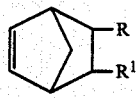

(II)

(III)

where R and $R^1$ are independently selected from hydrogen, alkyl groups of 1 to 20 carbon atoms, and saturated and unsaturated hydrocarbon cyclic groups formed by R and $R^1$ together with the two ring carbon atoms connected thereto containing 4 to 7 carbon atoms. In a preferred embodiment, R and $R^1$ are independently selected from hydrogen, alkyl groups of 1 to 3 carbon atoms, and monounsaturated hydrocarbon cyclic groups containing 5 carbon atoms, the cyclic group being formed by R and $R^1$ as well as by the two carbon atoms connected to R and $R^1$. In reference to formula III, $R^2$ and $R^3$ are independently selected from hydrogen and alkyl groups containing 1 to 20 carbon atoms, preferably 1 to 3 carbon atoms.
Examples of monomers referred to herein include
dicyclopentadiene,
methyltetra-cyclododecene,
2-norbornene and
other norbornene monomers such as
5-methyl-2-norbornene,
5,6-dimethyl-2-norbornene,
5-ethyl-2-norbornene,
5-butyl-2-norbornene,
5-hexyl-2-norbornene,
5-octyl-2-norbornene, and
5-dodecyl-2-norbornene.

This invention especially contemplates preparation of homopolymers, copolymers and terpolymers of methylnorbornene, methyltetracyclododecene and dicyclopentadiene and especially homopolymers of dicyclopentadiene.

DICYCLOPENTADIENE METATHESIS CATALYSIS

Dicyclopentadiene can be polymerized by the method of the invention and the resulting product is a rigid thermoset crosslinked homopolymer having high impact strength and high flexural modulus. The preferred monomer is commercially available endo-DCPD (3a,4,7,7a-tetrahydro-4,7-methano-1H-indene). The exo-isomer, while not commercially available, can be used just as well. The preferred commercially available material normally has a purity of 96–97%. Commercially available material should be purified in order to prevent impurities from inhibiting the polymerization.

The homopolymerization of the purified DCPD is catalyzed by a two part metathesis-catalyst system. One part contains a tungsten or tantalum containing catalyst, such as a tungsten halide or tungsten oxyhalide, preferably $WCl_6$, $WOCl_4$ or a tantalum composition. The other part contains an activator such as $SnBu_4$ or an alkylaluminum compound. The alkylaluminum compound can be an alkylaluminumdihalide or dialkylaluminum halide, where the alkyl group contains one to ten carbon atoms. In the preferred activator, the alkyl group is ethyl with diethyl aluminum chloride being most preferred.

Nguyen, U.S. patent application No. 554,467, filed Nov. 22, 1983 now abandoned and continuation-in-part application Ser. No. 723,022 filed Apr. 15, 1985, now U.S. Pat. No. 4,703,068, discloses a method for making a dicyclopentadiene cross-linked polymer using a tantalum composition, and that disclosure is incorporated herein by reference.

One part of the catalyst system comprises the tungsten containing catalyst, as described above, preferably in solution with DCPD monomer. The tungsten compound if unmodified, will rapidly polymerize the monomer. Consequently, the tungsten compound should first be suspended in a small amount of a suitable solvent. The solvent must not be susceptible to halogenation by the tungsten compound. Examples of preferred solvents are benzene, toluene, chlorobenzene, dichlorobenzene, and trichlorobenzene. Sufficient solvent should be added so that the tungsten compound concentration is between about 0.1 and 0.7 mole per liter of solvent.

The tungsten compound can be solublized by the addition of a small amount of an alcoholic or a phenolic compound. Phenolic compounds are preferred. Suitable phenolic compounds include phenol, alkyl-phenols, and halogenated phenols, with tert-butyl phenol, tert-octyl phenol and nonyl phenol being most preferred. The preferred molar ratio of tungsten compund/phenolic compound is from about 1:1 to about 1:3. The tungsten compound/phenolic compound solution can be made by adding the phenolic compound to a tungsten compound/organic solvent slurry, stirring the solution and then blowing a stream of a dry inert gas through the solution to remove the hydrogen chloride which is formed. Alternatively, a phenolic salt, such as a lithium or sodium phenoxide, can be added to a tungsten compound/organic solvent slurry, the mixture stirred until essentially all the tungsten compound is dissolved, and the precipitated inorganic salt removed by filtration or centrifugation. All of these steps should be carried out in the absence of moisture and air to prevent deactivation of the catalyst.

To prevent premature polymerization of the tungsten compound/monomer solution, which would occur within a matter of hours, from about 1 to about 5 moles of a Lewis base or a chelating agent can be added per mole of tungsten compound. Preferred chelants include acetylacetones, alkyl acetoacetates, where the alkyl group contains from one to ten carbon atoms; preferred Lewis bases are nitriles and ethers such as benzonitrile and tetrahydrofuran. The improvement in the stability and shelf-life of the tungsten compound/monomer solution is obtained whether the complexing agent is added before or after the phenolic compound. When purified DCPD is added to this catalyst solution it forms a solution which is stable and has a shelf-life of several months.

The other part of the metathesis-catalyst system comprises the activator, as described above, preferably in DCPD monomer. This mixture is storage stable and therefore, unlike the tungsten compound/monomer solution, needs no additives to prolong its shelf-life. If, however, an unmodified activator/monomer solution is mixed with the catalyst/monomer solution, the polymerization would initiate instantaneously and the polymer could set up in the mixing head. The onset of polymerization can be delayed by adding a moderator to the activator/monomer solution. Ethers, esters, ketones and nitriles can act as moderators for the alkylaluminum compounds. Isopropyl ether, di-n-butyl ether, ethyl benzoate, phenylethyl acetate and diisopropyl ketone are preferred. Ethyl benzoate and butyl ether are most preferred. The preferred ratio of the alkylaluminum to moderator is from about 1:1.5 to about 1:5 on a molar basis.

The polymerization time required for gelatin is also temperature dependent. As the temperature at which the reaction is carried out is increased the reaction rate will also increase. For every eight degree increase in temperature the reaction rate will approximately double. Consequently, to keep the reaction rate controlled at higher reaction temperatures a less active formulation of the metathesis-catalyst system should be used.

What is ultimately required is that when the catalyst system's components are combined, the resulting DCPD to tungsten compound ratio will be from about 1,000:1 to about 15,000:1 on a molar basis, preferably 2,000:1 and the DCPD to alkylaluminum ratio will be from about 100:1 to about 2000:1 on a molar basis, preferably about 200:1 to about 500:1. To illustrate a preferred combination: sufficient DCPD is added to a 0.1M tungsten containing catalyst solution prepared as described above, so that the final tungsten compound concentration is 0.007 molar. This corresponds to a DCPD to tungsten compound ratio of 1000:1. Sufficient DCPD is added to the diethyl AlCl solution, prepared as described above, so that the alkylaluminum concentration is 0.048M. This corresponds to a DCPD to alkylaluminum ratio of 150:1. If these two streams are mixed in a 1:1 ratio, the final ratio of DCPD to tungsten compound will be 2000:1, the final ratio of DCPD to alkylaluminum will be 300:1 and the final ratio of tungsten compound to alkylaluminum will be about 1:7. The illustrated combination is not the lowest catalyst level at which moldings can be made, but it is a practical level that provides for excess catalyst if impurities in the system consume some of the catalyst components. A higher alkylaluminum level will not only increase costs and residual chlorine levels but may result in a less satisfactory cure. Too low a tungsten compound concentration results in incomplete conversion. A wide range of alkylaluminum activator to tungsten catalyst formulations produce samples which have good out-of-mold properties such as tear resistance, stiffness, residual odor, and surface properties.

TANTALUM CATALYST SYSTEM

As disclosed by Nguyen in U.S. Pat. No. 4,703,068, the polymerization of the monomer is catalyzed by a metathesis-catalyst system. One part of the system is a pentavalent tantalum catalyst. The pentavalent tantalum catalyst may be represented by the formula Ta—$Y_5$, where Y represents a radical selected from the group of halides, preferably chlorides; alkoxys, represented by the formula —O—R, where the organic radical R is a hydrocarbyl containing from 1 to 10 carbon atoms; aryloxys, represented by the formula —O—Ar, where the organic radical Ar is an aromatic radical containing from 1 to 3 aromatic rings; and carboxys, represented by the formula —OOCR', where the organic radical R' is a hydrocarbyl containing from 1 to 10 carbon atoms. The preferred pentavalent tantalum catalyst is $TaCl_5$.

The other part of the metathesis-catalyst system is an organoaluminum or organoaluminum halide activator or mixtures thereof. Representative activators include trialkylaluminum, alkylaluminum dihalide and dialkylaluminum halide where the alkyl contains one to ten carbon atoms. In the preferred activators the alkyl is ethyl and the halide is chlorine. The most preferred activator is diethylaluminum chloride.

The pentavalent tantalum catalyst, as described above, is preferably in solution with the monomer or mixture of monomers to be polymerized. In a preferred embodiment, the pentavalent tantalum catalyst is first added to a small amount of a solvent to form a slurry. The solvent must not be susceptible to reaction with pentavalent tantalum catalyst. Examples of preferred solvents are benzene, xylene, toluene, chlorobenzene, dichlorobenzene, trichlorobenzene and hexane. Sufficient solvent is added so that the pentavalent tantalum catalyst concentration is between about 0.1 and 0.7 mole per liter of solvent. The pentavalent tantalum catalyst is then made soluble in the slurry by the addition to the slurry of a small amount of a solubilizer. Representative solubilizers include alcohols, phenols, perfluoro acid anhydride and mixtures thereof. Alcohols or phenols are preferred. Suitable phenols include phenol, alkylphenols, and halogen containing phenols, with tert-butyl phenol, tert-octyl phenol and nonyl phenol being most preferred. Suitable alcohols include methanol, ethanol and decylalcohol. The preferred molar ratio of pentavalent tantalum catalyst to solubilizer is from about 1:1 to about 1:3. The pentavalent tantalum catalyst-solubilizer solution can be made by adding the solubilizer to the pentavalent tantalum catalyst slurry, stirring the resulting solution and then blowing a stream of a dry inert gas through the solution to remove any gases which may be formed. Alternatively, a salt, such as a lithium or sodium phenoxide, can be added to the pentavalent tantalum catalyst slurry, the mixture stirred until essentially all the pentavalent tantalum catalyst is dissolved, and the precipitated inorganic salt removed by filtration or centrifugation. All of these steps should be carried out in the absence of moisture and air to prevent deactivation of the catalyst.

In some embodiments of the invention, it is desirable to increase the shelf-life of the catalyst solution. This is done by adding from about 1 to about 5 moles of a complexing agent such as a Lewis base or a chelant per mole of pentavalent tantalum catalyst to the pentavalent tantalum catalyst solution. Preferred Lewis bases include nitriles and ethers, such as, benzonitrile and tetrahydrofuran. Preferred chelants include acetylacetones and alkyl acetoacetates, where the alkyl group contains from one to ten carbon atoms. From about one to about five moles of complexing agent are added per mole of pentavalent tantalum catalyst in the solution. The improvement in the shelf-life of the pentavalent tantalum catalyst/monomer solution is obtained whether the complexing agent is added before or after the solubilizer is added.

The activator, as described above, is also preferably in solution with the monomer or mixture of monomers to be polymerized. It has been found that, in general, where a pentavalent tantalum catalyst is used in RIM or related processes there is no need to incorporate a rate moderator into the catalyst system. Using the above described catalyst system it is possible to combine the reactant streams in one place without their reacting before they can be injected into a mold.

The component of the catalyst system of this invention are combined so that the resulting monomer to pentavalent tantalum catalyst ratio, on a molar basis, is from about 1,000:1 to about 10,000:1, preferably about 2,000:1 and so that the resulting activator to a pentavalent tantalum catalyst ratio will be from about 2:1 to about 20:1, preferably about 10:1.

In those embodiments where a cross-linked polymeric foam is desired, a blowing agent is incorporated into the catalyst system. The blowing agent is incorporated into either or both parts of the metathesis-catalyst system, or it may be added to the monomer separately. The amount of blowing agent to be incorporated is from about 2 to about 30, preferably about 5 to about 20 percent by weight, based on the combined weight of the monomer and catalyst system.

Any of the conventional blowing agents used in RIM processes are employed provided that the blowing agent does not poison or otherwise adversely effect on the metathesis-catalyst system. Preferred blowing agents include low boiling organic compounds, i.e. compounds which are liquids under ambient conditions but which are volatilized under the conditions at which polymerization occurs. Representative low boiling organic compounds include hydrocarbons such as pentane, and hexane; halogenated hydrocarbons such as methylene chloride and trichlorofluoromethane. Representative inert gases, which are added under pressure to the catalyst system, include nitrogen, argon and halogenated hydrocarbons such as dichlorodifluoromethane.

The exact amounts of catalyst, activator and when desired, blowing agent, to be incorporated into a given catalyst system will depend on the particular catalyst, activator, blowing agent and other additives chosen as well as the desired final product. The amounts will be readily determinable by one skilled in the art without undue experimentation following the teachings of this specification.

ALTERNATIVE EMBODIMENTS

The polymer formed in accordance with the present invention may be produced from a monomeric mixture including the various additives, such as the flame-retardant colorant, fine fiber particles and other additives as are known to those skilled in the art.

In a preferred embodiment of the invention articles having chambers and/or channels are formed in a rotational mold which is simultaneously rotated around more than one axis. Exemplary of the products formed by this method are bathroom fixtures such as sinks, wash basins, bathtubs and commodes.

The mold may be attached to the arm of a McNeil-Akron Roto Cast rotational molding machine. The mold may be rotated on one axis at 8 RPM and simultaneously on a second axis at 9 RPM for about 2 minutes. The metathesis-catalyst polymerization mixture may be injected into the rotational mold prior to or during rotation. Heating of the mold and/or mixture is not required.

Preferably, the monomer solution in the rotational mold initially has a viscosity between 300 and 0.001 centipoise. More preferably the initial viscosity of the monomer solution is between 50 and 0.005 centipoise. Most preferably the initial viscosity of the monomer solution is between 10 and 0.01 centipoise.

The nonporous surface and high tensile and compressive strengths of the cross linked polymer formed make it ideal for handling water for both domestic and commercial uses. Other products formed by the process of the present invention include automobile body members such as dashboard panels and interior and exterior door panels; and boat members, for example, a unitary canoe or rowboat. Boats may be made in one or several pieces.

Tantalum Catalyst Preparation

Catalyst A

A nonylphenol solubilized tantalum pentachloride catalyst is prepared as follows:

0.45 g (1.3 mmol) $TaCl_5$ is added to an oven-dried polytube in a dry box. 0.23 g (1.3 mmol) nonylphenol in 13 ml chlorobenzene which has been sparged with argon for 1 hour is added to the polytube. The mixture is sparged for 1 hour to remove the HCl produced. Finally, chlorobenzene is added to the polytube to restore the original chlorobenzene level. This results in a 0.1 molar solubilized catalyst solution.

Catalyst B

A trifluoroacetic acid anhydride solubilized tantalum pantachloride catalyst is prepared as follows:

0.46 g (1.38 mmol) $TaCl_5$ is added to an oven-dried polytube in a dry box. 10 ml chlorobenzene is then added to the polytube to make a slurry. To this slurry is added 0.2 ml (1.4 mmol) trifluoro acidic acid anhydride. The $TaCl_5$ is dissolved and the solution is sparged with argon for 1 hour to remove HCl produced. Sufficient chlorobenzene is then added to the polytube to restore the original chlorobenzene level. This results in a 0.13 molar solubilized catalyst solution.

Catalyst C

An ethanol solubilized tantalum pentachloride catalyst is prepared as follows:

0.55 g (1.5 mmol) $TaCl_5$ is added to an oven-dried polytube in a dry box. 10 ml of chlorobenzene is then added to the polytube to make a slurry. 0.09 ml (1.5 mmol) ethanol is then added. The $TaCl_5$ is dissolved and the solution sparged with argon to remove HCl for 2 hours. This results in a 0.15 molar solubilized catalyst solution.

Catalyst D

A methanol solubilized tantalum pentachloride catalyst is prepared as follows:

0.96 g (2.7 mmol) $TaCl_5$ is added to an oven-dried polytube in a dry box. 10 ml of chlorobenzene is then added to make a slurry. To this slurry is added 0.54 ml (13.3 mmol) methanol. The $TaCl_5$ is dissolved and the solution is sparged with argon to remove HCl for 2 hours. Sufficient chlorobenzene is then added to the polytube to restore the original chlorobenzene level. This results in a 0.26 molar solubilized catalyst solution.

Catalyst E

A methanol-ethanol solubilized tantalum pentachloride catalyst is prepared as follows:

0.93 g (2.6 mmol) $TaCl_5$ is added to an oven-dried polytube in a dry box. 10 ml of toluene is then added to make a slurry. To this slurry is added 0.42 ml (10.4 mmol) methanol and the solution is sparged. After 1 hour, 0.15 ml (2.6 mmol) ethanol is added and the solution sparged an additional 2 hours with argon to remove HCl. Sufficient toluene is then added to the polytube to restore the original toluene level. This results in a 0.26 molar solubilized catalyst solution.

Catalyst F

A methanol-decyl alcohol solubilized tantalum pentachloride catalyst is prepared as follows:

3.6 g (10.2 mmol) $TaCl_5$ is added to an oven-dried pop bottle in a dry box. 50 ml toluene and then 1.96 ml (10.2 mmol) decyl alcohol are then added to produce a homogenous solution. The solution is stirred for 5 minutes and sparged with argon. Then 0.83 ml (20.4 mmol) methanol is added and the mixture sparged with argon for 2 hours to remove the HCl which is produced. Sufficient toluene is then added back to the pop bottle to produce a 0.21 molar solubilized catalyst solution.

Catalyst G

A methanol-nonphenol solubilized tantalum pentachloride catalyst is prepared as follows:

3.5 g (10 mmol) $TaCl_5$ is added to an oven-dried pop bottle in a dry box. 50 ml toluene and 2 ml (10 mmol) nonylphenol are added. The solution is stirred and sparged with argon for 10 minutes. 0.82 ml (20.2 mmol) methanol is added and the mixture sparged with argon for 2 hours to remove the HCl which is produced. Sufficient toluene is then added back to the pop bottle to restore the original level. This results in a 0.2 molar solubilized catalyst solution.

Polymerization using Tantalum Catalyst

Items 1-7 illustrate preferred embodiments of preparing crosslinked poly(DCPD) using a tantalum pentachloride catalyst, prepared as described above, and a diethyl aluminum chloride (DEAC) activator.

In each item, 1-7, a 15 mm diameter, 125 mm length test tube, capped with an unextracted rubber stopper, is sparged with nitrogen for 10 minutes. 5 ml (38 mmol) DCPD is then added and the test tube sparged for an additional 10 minutes. A tantalum pentachloride catalyst is then added by syringe. After inserting a thermocouple, DEAC is added by syringe and each test tube is then shaken several times to mix the components. The particular tantalum pentachloride catalyst solution and the molar ratio of monomer to tantalum to DEAC is shown in Table 1. Each test tube is then placed in a water bath, heated to 60° C. For each sample, the mixture rapidly reacts to form a polymer which visual inspection shows has little color and good transparency. In each item the change in temperature of the combined solutions ($\Delta T$) and the time until $\frac{1}{2}$ exotherm ($t\frac{1}{2}$) is measured and is shown in Table 1. The exotherm is an indication of the rate and completeness of the polymerization. The shorter the time until the exotherm, the faster the reaction and the higher the temperature and the longer the duration of the exotherm, the greater the degree of crosslinking and polymerization.

TABLE 1

| Item | Catalyst | DCPD:Ta:DEAC Molar Ratio | $\Delta T$ | $t\frac{1}{2}$ |
|---|---|---|---|---|
| 1 | A | 2000:1:3 | 170° C. | 2 minutes |
| 2 | B | 8000:1:9 | 148° C. | 45 minutes |
| 3 | C | 2000:1:3 | 168° C. | 2.7 minutes |
| 4 | D | 2000:1:4 | 161° C. | 1 minute |
| 5 | E | 2000:1:3 | 163° C. | 1.5 minutes |
| 6 | F | 4000:1:6 | 156° C. | 1.8 minutes |
| 7 | G | 3000:1:4.5 | 169° C. | 1.4 minutes |

EXAMPLE I

Reaction Rotation Molding of dicyclopentadiene (DCPD) using the tantalum catalyst $TaCl_2(OCH_3)_2$—$OC_{10}H_{23}$ and diethylaluminum chloride A 4 cm (ID) polyvinylchloride tube (length 28 cm), with a rubber stopper at both ends is sparged with $N_2$ for 30 minutes. Into this tube, a solution of 150 ml purified DCPD, 2.1 ml (0.42 mmol) of 0.2M $TaCl_2(OCH_3)_2OC_{10}H_{23}$ (catalyst A above) in toluene, and 6 ml (2.16 mmol) of diethylaluminum chloride (0.36M in toluene) was transferred by cannula. The transferred process took approximately 3 minutes. The tube was then rolled by a roller machine ($\approx$20 rpm). After 30 minutes, the tube was opened and a poly-DCPD tube is obtained (length: 27 cm, OD: 4 cm, ID: 3 cm). The inner surface and the outer surface of this poly-DCPD tube is smooth. The tube is concentric with even thickness throughout.

EXAMPLE II

Reaction Rotation Molding of Dicyclopentadiene with Wollastonite

To a slurry mixture of 150 g of DCPD, 2.1 ml (0.42 mmol) of 0.2M $TaCl_5/2CH_3OH/1HOPhC_9H_{19}$ (catalyst G above) in toluene and 57.5 g of Wollastonite ($CaSiO_3$) in a glass bottle (1602 volume) that is being sparged with $N_2$, 6 ml (2.16 mmol) of DEAC is added from a syringe. The mixture is shaken several times, then poured openly into a polyvinylchloride tube (length: 28 cm, ID: 4 cm) that is capped by a stopper at one end. The tube is then capped and rotated by a roller machine ($\approx$20 rpm). After 15 minutes, a poly-DCPD tube with Wollastonite as a filler is obtained (length: 27 cm, OD: 4 cm). The inner surface and the outer surface are relatively smooth. The tube is concentric with even thickness throughout.

EXAMPLE III

Reaction Rotation molding of DCPD using a tungsten catalyst and diethylaluminum iodide To a mixture of 94.2 ml of DCPD, 0.57 ml of di-n-butyl ether) 5.28 ml of diethylaluminum iodide (0.43M in toluene) is added 7.5 ml of 0.1M solution of $WCl_6$/acetylacetone/nonylphenol (ratio: 1:2:1) in toluene, under $N_2$. The mixture is then immediately poured into a polyvinyl chloride tube (length: 30 cm; ID: 5 cm) with a rubber stopper at one end. The tube is capped with another stopper and then rolled on a roller machine at about 20 rpm). After 10 minutes, the DCPD polymerizes, forming a concentric tube length 28 cm; OD: 5 cm; thickness 3 mm.

From the foregoing description, one skilled in the art can easily ascertain the essential characteristics of this invention, and without departing from the spirit and scope thereof, can make various changes and modifications of the invention to adapt it to various usages and conditions within the scope of the claims.

What is claimed is:

1. A method of forming rigid cross-linked polymeric solid articles having one or more chambers therein from a liquid monomer solution comprising:
   (a) providing a liquid monomer solution, and rotational molding means, said molding means having an inner chamber wall defining an inner chamber, said liquid monomer solution comprising tantalum catalyst, dicyclopentadiene, and activator of a metathesis-catalyst system, said tantalum catalyst comprising tantalum said solution not comprising an amount of moderator effective to delay substantial polymerization ten seconds or more, said solution being effective to allow distribution of said liquid monomer within said rotational molding means to substantially the shape of the article being formed in from ten seconds to one minute and prior to any substantial rise in viscosity of said liquid monomer due to polymerization;
   (b) conveying said solution into said rotational molding means, the amount of said solution within said molding means being insufficient to fill said inner chamber;
   (c) rotating said rotational molding means, the rate of rotation being at least sufficient to substantially evenly distribute said solution along said inner chamber wall prior to a substantial increase in viscosity of said solution due to polymerization; thereby forming at least one chamber in said solution;
   (d) continuing said rotation while said solution polymerizes to form a rigid solid article of cross-linked polymer comprising polymerized units of dicyclopentadiene, said article having at least one chamber therein.

2. The method of claim 1 wherein said inner chamber and said article are substantially cylindrical; and said chamber within said article and said cylindrical article are coaxial.

3. The method of claim 1 further comprising:
   (e) removing said article from said mold.

4. The method of claim 1 further comprising adding a first and a second monomer solution to form said liquid metathesis-catalysis solution.

5. The method of claim 1 wherein said inner chamber generally is cylindrical, elongated at both ends and horizontal.

6. The method of claim 1 wherein said molding means is rotated on a first axis at a first rate of rotation and said molding means is simultaneously rotated on a second axis at a second rate of rotation while said solution polymerizes to form a rigid article having a nonporous surface.

7. The method of claim 1 wherein said activator is an alkyl aluminum compound.

8. The method of claim 1 wherein said activator is diethylaluminum chloride.

9. The method of claim 1 wherein said tantalum catalyst comprises tantalum pentachloride.

* * * * *

UNITED STATES PATENT AND TRADEMARK OFFICE
CERTIFICATE OF CORRECTION

PATENT NO. : 4,808,364

DATED : February 28, 1989

INVENTOR(S) : Harry W. Blunt et al.

It is certified that error appears in the above-identified patent and that said Letters Patent is hereby corrected as shown below:

Column 7, line 32 " gelatin "

should read -- gelation --

Signed and Sealed this

Seventh Day of November, 1989

Attest:

JEFFREY M. SAMUELS

*Attesting Officer*     *Acting Commissioner of Patents and Trademarks*